(12) United States Patent
Ratsos et al.

(10) Patent No.: US 7,758,107 B2
(45) Date of Patent: Jul. 20, 2010

(54) DUAL CELL BODY SIDE RAIL FOR AUTOMOTIVE VEHICLES

(75) Inventors: Lou Ratsos, Commerce Township, MI (US); John T. Reed, Hudson, OH (US); Frank J. Day, South Lyon, MI (US); Gregory S. Frederick, Shelby Township, MI (US); Hikmat F. Mahmood, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/182,022

(22) Filed: Jul. 29, 2008

(65) Prior Publication Data

US 2010/0026053 A1    Feb. 4, 2010

(51) Int. Cl.
     *B60K 37/00*      (2006.01)
(52) U.S. Cl. .............................. 296/203.03; 296/187.05
(58) Field of Classification Search ............ 296/203.03, 296/187.05; 105/404; 5/200.1
See application file for complete search history.

(56) References Cited

U.S. PATENT DOCUMENTS

| | | | | |
|---|---|---|---|---|
| 4,826,238 A | * | 5/1989 | Misono et al. ............... | 296/209 |
| 4,875,733 A | * | 10/1989 | Chado et al. ........... | 296/203.04 |
| 4,986,597 A | * | 1/1991 | Clausen ...................... | 296/205 |
| 5,078,439 A | * | 1/1992 | Terada et al. ................. | 293/122 |
| 5,102,186 A | * | 4/1992 | Yoshii et al. ........... | 296/203.04 |
| 5,246,263 A | * | 9/1993 | Tanaka et al. .......... | 296/187.11 |
| 5,246,264 A | * | 9/1993 | Yoshii .................... | 296/203.03 |
| 5,269,585 A | * | 12/1993 | Klages et al. ............... | 296/205 |
| 5,318,338 A | * | 6/1994 | Ikeda .......................... | 296/210 |
| 5,388,885 A | * | 2/1995 | Warren ................... | 296/203.03 |
| 5,443,297 A | * | 8/1995 | Tanaka et al. .......... | 296/203.03 |
| 5,549,352 A | * | 8/1996 | Janotik et al. ............... | 296/209 |
| 5,560,672 A | * | 10/1996 | Lim et al. .............. | 296/187.05 |
| 5,609,385 A | * | 3/1997 | Daniel et al. ........... | 296/187.05 |
| 5,720,510 A | * | 2/1998 | Daniel et al. ........... | 296/187.05 |
| 5,725,271 A | * | 3/1998 | Patel et al. ............. | 296/187.05 |
| 5,829,824 A | * | 11/1998 | Yamamuro et al. .......... | 296/204 |
| 5,836,641 A | * | 11/1998 | Sugamoto et al. ...... | 296/187.05 |
| 5,839,776 A | * | 11/1998 | Clausen et al. ......... | 296/187.03 |
| 5,860,694 A | * | 1/1999 | Seefried et al. ........ | 296/203.03 |
| 6,042,176 A | * | 3/2000 | Ikeda et al. ............ | 296/187.05 |
| 6,073,992 A | * | 6/2000 | Yamauchi et al. ...... | 296/203.01 |
| 6,102,472 A | * | 8/2000 | Wallstrom ............. | 296/203.01 |
| 6,123,378 A | * | 9/2000 | Teply et al. ................... | 296/29 |

(Continued)

*Primary Examiner*—Kiran B. Patel
(74) *Attorney, Agent, or Firm*—Frederick Owens, Esq.; Miller Law Group, PLLC (57) ABSTRACT

A body side rail construction for an automotive vehicle is formed in a dual cell configuration. A reversed C-shaped channel is welded to the closed section of the conventional roof side rail member to enable the body side rail member to be a smaller section that is less susceptible to buckling as the body side rail member transfers load to the front and rear corner pillars. The C-shaped cross-sectional configuration presents advantages for manufacturing as it can be shaped to provide the attaching brackets and horns for mounting the front header, roof bow, and rear header members to the body side rail without the addition of individual end items to serve this function. From a shipping density standpoint, this design gives maximum structure while maintaining good rack density that enables relatively straight parts to be nested together while still providing the increased section strength required for enhanced roof performance.

11 Claims, 6 Drawing Sheets

U.S. PATENT DOCUMENTS

| | | | | |
|---|---|---|---|---|
| 6,315,353 B1* | 11/2001 | Brodt et al. | | 296/203.03 |
| 6,322,134 B1* | 11/2001 | Yang | | 296/203.02 |
| 6,325,450 B2* | 12/2001 | Sakyo et al. | | 296/190.08 |
| 6,397,553 B1* | 6/2002 | Horikawa et al. | | 296/187.05 |
| 6,428,064 B1* | 8/2002 | Frederick | | 293/120 |
| 6,474,726 B1* | 11/2002 | Hanakawa et al. | | 296/191 |
| 6,554,350 B2* | 4/2003 | Takahara | | 296/187.05 |
| 6,578,909 B1* | 6/2003 | Reed et al. | | 296/210 |
| 6,595,579 B2* | 7/2003 | Freitag et al. | | 296/187.12 |
| 6,623,067 B2* | 9/2003 | Gabbianelli et al. | | 296/205 |
| 6,692,065 B2* | 2/2004 | Yamamoto et al. | | 296/205 |
| 7,036,874 B2* | 5/2006 | Stojkovic et al. | | 296/193.09 |
| 7,264,302 B2* | 9/2007 | Nagashima | | 296/187.12 |
| 7,273,247 B2* | 9/2007 | Grueneklee et al. | | 296/205 |
| 7,364,226 B2* | 4/2008 | McNulty et al. | | 296/209 |
| 7,445,269 B2* | 11/2008 | Yustick et al. | | 296/187.01 |
| 7,467,821 B2* | 12/2008 | Wolkersdorfer | | 296/203.04 |
| 7,472,948 B2* | 1/2009 | Yatabe et al. | | 296/203.04 |
| 7,543,882 B2* | 6/2009 | Day et al. | | 296/193.06 |
| 7,543,884 B2* | 6/2009 | Reed et al. | | 296/210 |
| 2002/0033618 A1* | 3/2002 | Kwon | | 296/203.03 |
| 2008/0052908 A1* | 3/2008 | Reed et al. | | 29/897.2 |
| 2009/0212602 A1* | 8/2009 | Reed et al. | | 296/210 |

* cited by examiner

DUAL CELL BODY SIDE RAIL FOR AUTOMOTIVE VEHICLES

FIELD OF THE INVENTION

This invention relates to the frame of an automotive vehicle and, more particularly, to a body side rail configuration to improve strength in the roof frame members particularly for vehicles not having an intermediate B-pillar construction.

BACKGROUND OF THE INVENTION

The frame of an automotive vehicle supports an operator's compartment and includes a roof supported by generally vertical members commonly referred to as pillars. For some vehicles, the roof is normally supported by front and rear pillars, also known as the "A" and "B" pillars. Other vehicle configurations can include front and rear pillars with a support pillar between the front and rear pillars, in which case the front and rear pillars would be referred to as the "A" and "C" pillars and the intermediate pillar would be the "B" pillar. The frame of the vehicle is required to withstand certain forces relating to roof strength of the vehicle. Those roof strength standards help determine the configuration of the vehicle frame. Automotive vehicles are often designed with an operator's compartment that includes a rear passenger seat and a set of rear doors that can be hinged on the rear pillars, instead of the intermediate B-pillar, to provide an open span between the front and rear pillars when the front and rear doors are opened.

These different frame configurations have a direct impact on the design of the frame components of the automobile. The longer the unsupported open span, such as can be found on some pick-up trucks where the rear door hinges on the rear "B" pillar, the greater the challenge to support the load that must be transferred into the frame components to meet roof strength requirements. The longer unsupported roof spans also, consequentially, will increase the moment applied to the base of the rear pillar of the operator's cab in vehicles, such as pick-up trucks.

The known design strategy for the frame components forming the body side construction of an automotive vehicle is to manufacture these components through stamping and bending of sheet metal to form the individual frame components with a generally uniform cross-section that is consistent with these known manufacturing processes. The size and shape of the cross-sectional configuration of the respective individual component is dictated by the strength required at the highest load point asserted on that individual component. Efforts have been made over the years to modify the shape of the cross-section and the thickness of the sheet metal in attempts to maintain the requisite strength parameters while reducing the weight of the respective frame components, and thus the cost of production thereof. Nevertheless, maintaining the generally uniform size and shape of the individual frame component results in a part or a component that weighs more then required to carry the load.

Thus, it would be desirable to provide a body side rail construction for automobiles that can carry the required load encountered by the body side rail without substantially increasing the weight of the body side rail.

SUMMARY OF THE INVENTION

It is an object of this invention to overcome the aforementioned disadvantages of the known prior art by providing a body side rail construction for automotive vehicles that enhanced by the addition of a C-shaped channel to the conventional formed side rail member.

It is another object of this invention to provide a body side rail construction for automobiles that can carry the load imposed thereon along without the support of an intermediate B-pillar.

It is a feature of this invention that the body side rail member can be formed with a C-channel welded to the side of the conventional formed body side rail to form a dual cell side rail member.

It is an advantage of this invention that the dual cell body side rail construction increases the strength of the body side rail without adding substantial weight to the body side rail member.

It is another advantage of this invention that the C-channel can be configured to carry the brackets needed to mount the front header, roof bow and rear header members.

It is still another advantage of this invention that the shipping package for the body side rails is not substantially increased.

It is still another feature of this invention that an integral space frame configuration is not required to increase the strength of the body side rail members.

It is still another advantage of this invention that the open section member can be welded to the closed section member in a number of different configurations.

It is yet another advantage of this invention that the body side rail can be used to carry the requite load between front and rear pillars without requiring an intermediate pillar structure.

It is still another object of this invention to provide a dual cell body side rail for an automotive vehicle that is durable in construction, inexpensive of manufacture, carefree of maintenance, facile in assemblage, and simple and effective in use.

These and other objects, features and advantages are accomplished according to the instant invention by providing a body side rail construction for an automotive vehicle that is formed in a dual cell configuration. A reversed C-shaped channel is welded to the closed section of the conventional roof side rail member to enable the body side rail member to be a smaller section that will be less susceptible to buckling as the body side rail member transfers load to the front and rear corner pillars. The c-shaped cross-sectional configuration presents considerable advantages for manufacturing because it can be shaped to provide the attaching brackets and horns for mounting the front header, roof bow, and rear header members to the body side rail member without the addition of individual end items to serve this function. From a shipping density standpoint this design gives maximum structure while maintaining good rack density that enables relatively straight parts to be nested together while still providing the increased section strength required for enhanced roof performance.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
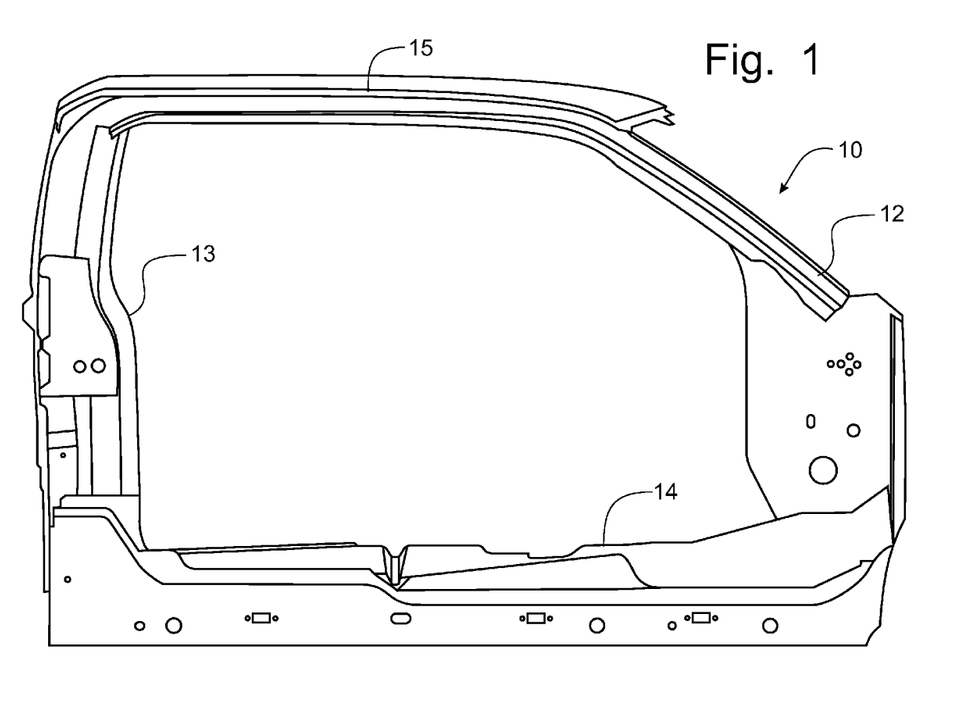
FIG. 1 is a side elevational view of a body side frame construction for an automotive vehicle incorporating the principles of the instant invention.

Referring to the drawings, a body side frame construction for an automotive vehicle, such as an operator's cab of a pick-up truck, can be seen. Any right or left references are used as a matter of convenience and are determined by standing at the rear of the vehicle and facing forward into the normal direction of forward travel. The body side frame construction 10 includes a front pillar 12, a rear corner pillar 13 and a roof rail structure 15 extending between the front and rear pillars 12, 13. The frame 10 of the operator's cab is formed with a generally vertical front (or "A") pillar 12 extending between the floor member 14 and the roof structure 15. The rear pillar 13 completes the generally rectangular configuration of the body side frame construction 10 and is intended to mount by hinges (not shown) both front and rear doors (not shown). The front door will normally hinge on the front "A" pillar 12, while the rear "B" pillar can support the hinges for the rear door. The roof structure 15 extends from the right side of the vehicle to the left side over top of the operator's cab, spanning between the transversely spaced front and rear corner pillars 12, 13. The left and right sides of the vehicle are substantially identical mirror images of one another.

Each of the rear corner pillars 13, though only one is depicted in the drawings, is formed in a dual cell configuration as is described in co-pending U.S. patent application Ser. No. 11/429,096, filed on May 5, 2006, the contents of which are incorporated herein by reference. Preferably the roof structure 15 will engage the rear corner pillar 13 in a manner to provide a smooth and integral transition from the rear pillar 13 into the roof side rails 16. The roof side rails 16 extend forwardly and eventually forwardly and downwardly to create the front "A" pillar 12.

Figure 2:
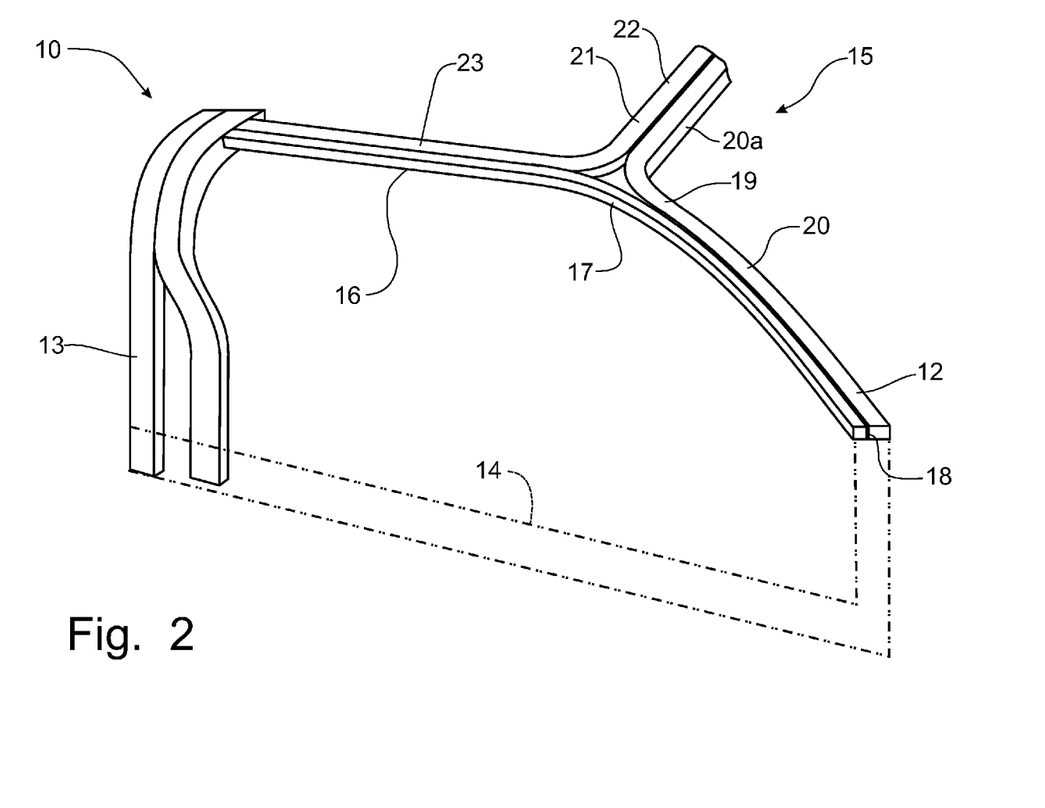
FIG. 2 is a partial perspective view of a first embodiment of the body side frame construction showing the respective tubular members.
Figure 3:
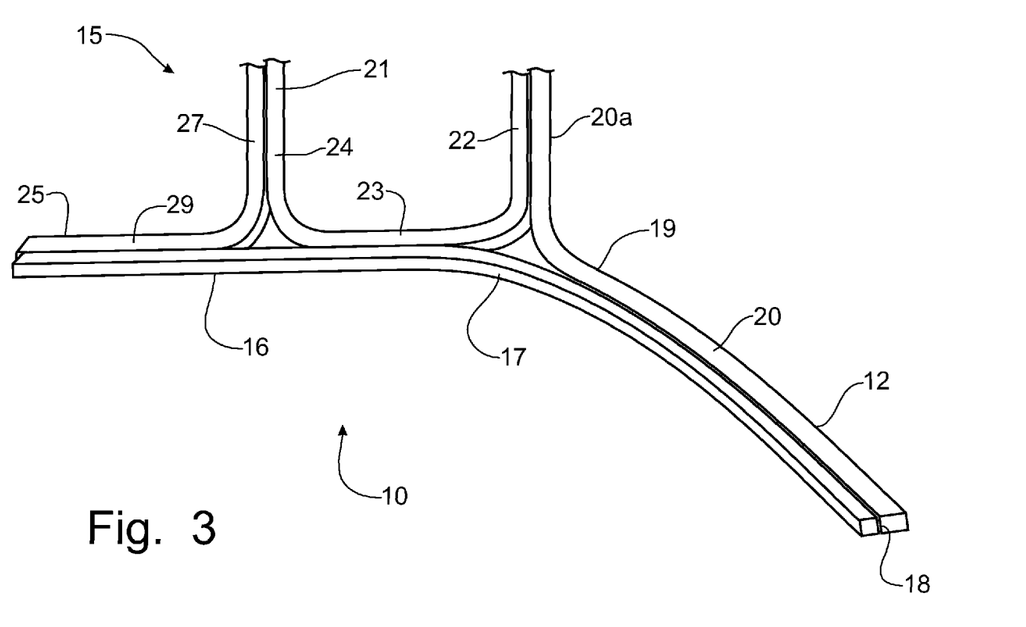
FIG. 3 is a partial perspective view of a second embodiment of the body side frame construction showing the deployment of multiple tubular members forming the body side members.

An integral body side rail and cross member configuration can be seen in FIGS. 1-3, the front "A" pillar 12 is integrally formed with the roof side rails 16. These components of the body side construction 10 are preferably formed from tubular members, including a rail outer tube 17 that preferably extends from the front "A" pillar 12 to the rear corner pillar 13, a roof header rail 19, and a front roof rail 21. The roof header rail 19 can have a forward portion 20 that co-extends along the rail outer tube 17 to form the front pillar 12. The roof header rail 19 bends at the top end of the front pillar 12 to form a header portion 20a that projects across the front edge of the roof structure 15 toward the opposing roof header rail (not shown) from the opposing body side construction. The front roof rail 21 is formed with a front leg 22 that extends along the front portion of the roof structure 15 next to and rearwardly of the roof header rail 19 and bends rearwardly into a side portion 23 at the top of the front pillar 12 to extend rearwardly along the rail outer tube 17 toward the rear corner pillar 13. The full roof structure 15 is formed when the corresponding side body frame members are welded together at the center of the roof structure 15.

In the embodiment depicted in FIG. 3, the roof structure 15 requires additional structural support from the body side frame construction. To provide the additional strength required for the roof structure 15 in this particular embodiment, the front roof rail 21 is formed in a U-shape such that a rear leg 24 is integrally formed with the front leg 22 and the side portion 23 and the rear leg 24 extends across the roof structure 15 generally parallel to the front leg 22. A rear roof rail 25 is utilized to complete the roof structure 15. The rear roof rail 25 is formed with a front leg 27 that is positioned behind the rear leg 24 of the front roof rail 21 and bends into a side portion 29 next to the rail outer tube 17 to extend along the rail outer tube 17 to the rear pillar 13.

One skilled in the art can see that the formation of the body side frame components by tubular members allows the roof structure to be integrally formed with the roof side rail 16 and the front pillar 12 without sacrificing strength. The adjacent tubular rail outer tube 17 and the forward portion 20 of the roof header rail 19 form a strong front pillar 12 with an internal reinforcement web 18 created by the adjacent walls of the tubular members increasing the strength of the front pillar section. Furthermore, the rail outer tube 17 can be a two inch tubular member that extends substantially uniformly from the lower end of the front pillar 12 to the rear pillar 13. As such, the rail outer tube can be roll-formed. This size of tubular member can meet the minimum strength requirements of the roof side rail 16, while the addition of the other tubular members 19, 21 and 25, bolster the strength of the rail outer tube 17 to meet the maximum strength requirements.

Figure 4:
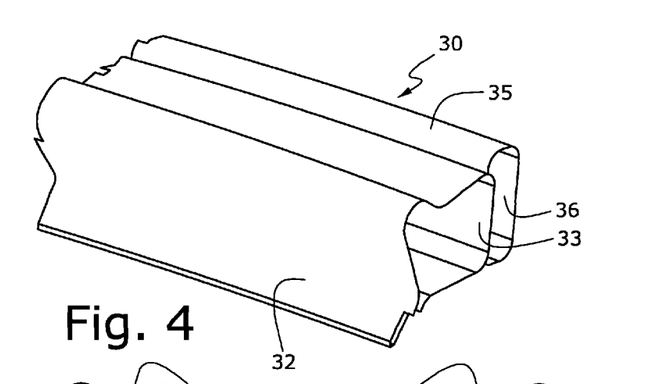
FIG. 4 is a partial perspective view of another alternative embodiment of the body side rail member having a C-shaped channel affixed to create a dual cell body side rail member incorporating the principles of the instant invention.
Figure 4A:
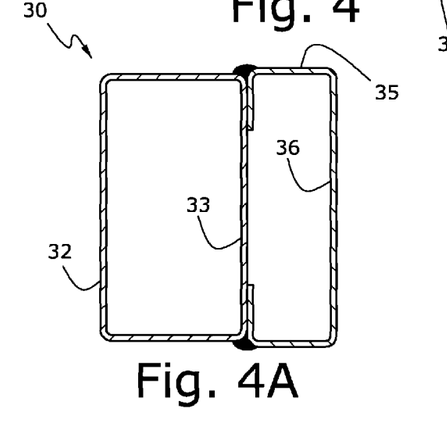
FIG. 4A is a cross-sectional view through the body side rail member of FIG. 4 to show a first weld pattern configuration.
Figure 4B:
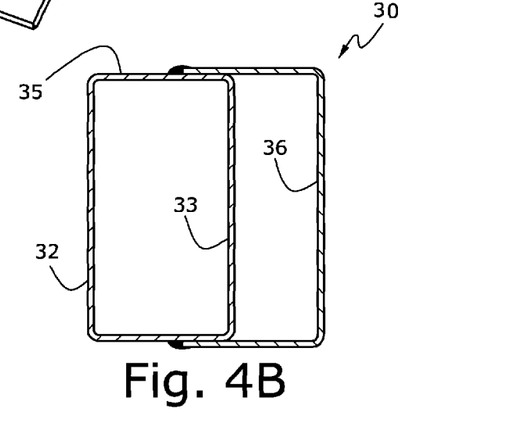
FIG. 4B is a cross-sectional view through the body side rail member of FIG. 4 to show a second weld pattern configuration.
Figure 5:
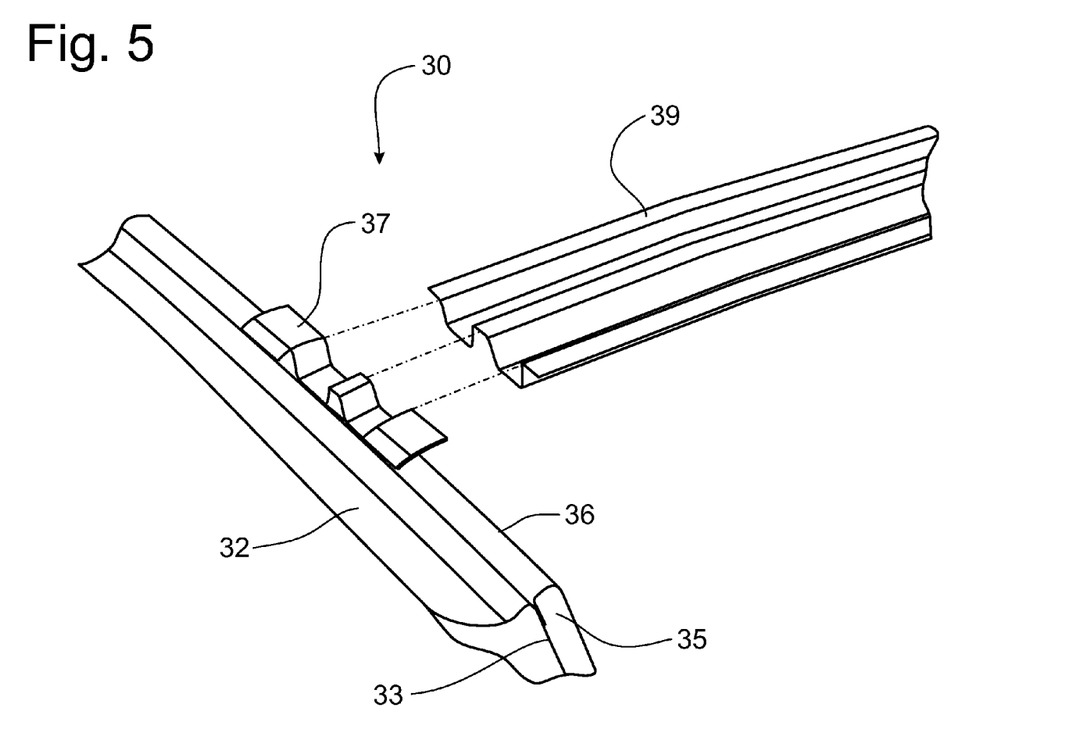
FIG. 5 is a perspective view of the body side rail member shown in FIG. 4 and having a mounting bracket affixed to the c-shaped channel for the mounting of a roof bow member to create the frame for the vehicle roof.

One problem associated with the integral body side rail and cross member configuration is the shipping package required to transport these integral frame members from the place of manufacture thereof to the plant where the assembly of the vehicle will occur. The integral roof frame 10 requires a large shipping package, which is largely composed of air, to accommodate the longitudinal length of the body side rail members 16 and the transverse width of the cross frame members, such as the roof front header 21. An alternative body side rail construction 30 is shown in FIGS. 4-6, which will provide adequate strength to carry the imposed load between the front and rear pillars 12, 13, without requiring a large shipping package that will need to accommodate the transverse frame members.

The dual cell body side rail 30 includes a first closed section, conventional body side rail 32, which can be a rolled, formed and welded member, or formed through a hydroforming process, coupled with a second open section, preferably C-shaped channel, member 35 welded to the side of the conventional body side rail 32 to form the dual cell configuration. The C-shaped channel member 35 is preferably formed with a side wall 36 interconnecting top and bottom walls. The welding of the C-shaped channel member 35 to the first closed section member 32 preferably places the inside wall 33 of the first body side rail member 32 as an internal web for the dual cell configuration 30 with the side wall 36 of the C-shaped channel member 35 being spaced from the inner wall 33.

In the weld pattern shown in FIG. 4A, each of the top and bottom walls are formed with a short return leg that is oriented parallel to the inside wall 33 of the roof side rail member 32 such that the welding of the C-channel 35 to the roof side rail member 32 places those two return legs against the inside wall 33 of the roof side rail 32 to provide a partial double wall thickness to the subsequently formed internal web of the dual cell configuration 30. Alternatively, as is depicted in FIG. 4B, the top and bottom walls of the C-channel 35 could be simply overlapped on the top and bottom walls of the roof side rail member 32 and welded thereto. The end result is a dual cell body side rail configuration 30 that has greatly improved strength that can carry an enhanced load between the front and rear pillars 12, 13, even when the vehicle frame does not utilize an intermediate pillar member between the front and rear pillars 12, 13, such as is found for pick-up trucks having a rear hinged rear door.

Figure 6:
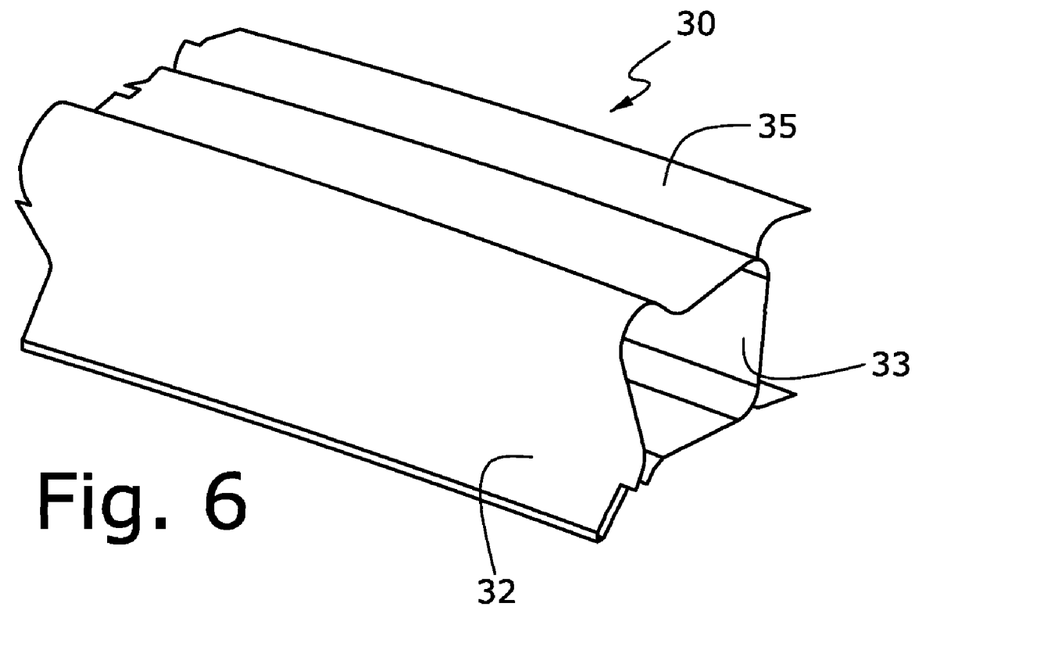
FIG. 6 is a partial perspective view of another alternative embodiment of the body side rail member having a C-shaped open channel affixed to the closed section primary body side rail in a configuration opposite to that shown in FIG. 4.

An alternative configuration for the C-channel 35 is depicted in FIG. 6. By welding the side wall 36 of the C-channel 35 directly to the inside wall 33 of the roof side rail member 32, the subsequently formed internal web will have a full double thickness and the inwardly extending top and bottom walls of the C-channel will be positioned to receive the header bow and other cross members between the top and bottom walls of the C-channel 35 to permit the cross members to be welded directly to the C-channel without requiring a bracket for attaching the cross members.

As is represented in FIG. 5, the preferred embodiment of the C-shaped channel 35 can be formed with the mounting brackets 37 welded thereto prior to be welded to the first body side rail member 32. The mounting brackets 37 and other similar structure are utilized for attaching the cross frame members, such as the roof bow member 39, as representatively shown in FIG. 5, and the front and rear headers. Accordingly, the dual cell side rail configuration 30 can be welded together at the manufacturing plant and shipped with the brackets 37 attached, but not the cross members 39 which would be attached to the brackets 37 by fasteners or by welding at the assembly plant. The dual cell body side rail configuration 30 extends substantially longitudinally and without the attached cross frame members presents a more compact shipping package.

Thus, from a shipping density standpoint, the design of this dual cell body side rail configuration 30 gives maximum structure to resist buckling under load to transfer the load to the front and rear pillar structures, while maintaining good rack density. The dual cell body side rail configuration 30 enables relatively straight frame components, such as the roof side rail members, the front and rear header members and the roof cross bows, to be nested to each other for shipping purposes while still providing a structural design to attain the increased section strength required for enhanced roof performance.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an automotive vehicle body side frame having a front pillar, a rear pillar spaced longitudinally rearwardly of the front pillar, and a roof structure interconnecting the front and rear pillars, the roof structure including a roof side rail extending between the front and rear pillars, the improvement comprising:
   the roof side rail being formed from a first closed section member and a second open section member affixed to a wall of the first closed section member to form a dual cell roof side rail configuration; and
   at least one mounting bracket mounted on the second open section member for connection of at least one corresponding cross frame member to the dual cell roof side rail.

2. The body side frame of claim 1 wherein the first closed section member has a generally rectangular cross-section having an outer side wall and the wall, the second open section member being affixed to the wall.

3. The body side frame of claim 2 wherein second open section member is a C-shaped channel member having a side wall interconnecting top and bottom walls.

4. The body side frame of claim 3 wherein the C-shaped channel member is welded to the wall of the first closed section member such that the side wall of the C-shaped channel member is spaced from the wall.

5. The body side frame of claim 4 wherein the top and bottom walls of the C-shaped channel are formed with return legs that are oriented generally parallel to the wall of the first closed section to provide partial double thickness to the wall when the C-shaped channel is welded thereto.

6. The body side frame of claim 3 wherein the C-shaped channel member is welded to the wall of the first closed section member such that the side wall of the C-shaped channel member is joined to the wall.

7. An automotive vehicle body side frame, comprising:
   a front pillar;
   a rear pillar spaced longitudinally rearwardly of the front pillar; and
   a roof structure interconnecting the front and rear pillars, the roof structure including a roof side rail extending between the front and rear pillars, the roof side rail being formed from a first closed section member and a second open section member affixed to a wall of the first closed section member to form a dual cell roof side rail configuration, the first closed section member having a generally rectangular cross-section having an outer side wall and the wall, the second open section member being a C-shaped channel member affixed to the wall of the closed section with the side wall of the C-shaped channel member abutting the wall to form a double thickness at the wall.

8. The body side frame of claim 7 further comprising at least one mounting bracket mounted on the C-shaped channel member for connection of at least one corresponding cross frame member to the dual cell roof side rail.

9. The body side frame of claim 7 wherein the top and bottom walls of the C-shaped channel are formed with top and bottom walls that are oriented generally perpendicularly to the wall of the first closed section and projecting outwardly therefrom.

10. An automotive vehicle body side frame, comprising:
    a front pillar;
    a rear pillar spaced longitudinally rearwardly of the front pillar; and
    a roof structure interconnecting the front and rear pillars, the roof structure including a roof side rail extending between the front and rear pillars, the roof side rail being formed from a first closed section member and a second open section member affixed to a wall of the first closed section member to form a dual cell roof side rail configuration, the first closed section member having a generally rectangular cross-section formed with an outer side wall and the wall, the second open section member being a C-shaped channel member affixed to the wall of the first closed section member and having at least one mounting bracket mounted thereon for connection of at least one corresponding cross frame member to the roof side rail.

11. The body side frame of claim 10 wherein the C-shaped channel member is oriented with the side wall thereof abutting the wall of the first closed section member to form a double thickness at the wall.

* * * * *